US012619650B2

(12) United States Patent
Arbib et al.

(10) Patent No.: US 12,619,650 B2
(45) Date of Patent: May 5, 2026

(54) TECHNIQUES FOR SECURING COMPUTING INTERFACES USING CLUSTERING

(71) Applicant: Noname Gate Ltd., Tel Aviv-Jaffa (IL)

(72) Inventors: Adi Chen Arbib, Netanya (IL); Adi Vardi, Tel Aviv (IL); Shai Meir, Tzur Yitzhak (IL); Yaniv Gabay, Tel Aviv (IL); Yuval Alkalai Tavori, Ramat Gan (IL); Idan Tager, Givatayim (IL); Itzhak Gershfeld, Rishon le Zion (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/663,417

(22) Filed: May 14, 2024

(65) Prior Publication Data

US 2024/0338401 A1 Oct. 10, 2024

Related U.S. Application Data

(63) Continuation of application No. 18/297,789, filed on Apr. 10, 2023, now Pat. No. 12,189,673.

(51) Int. Cl.
G06F 16/355 (2025.01)

(52) U.S. Cl.
CPC .................................. G06F 16/355 (2019.01)

(58) Field of Classification Search
CPC .................................................. G06F 16/355
USPC .......................................................... 707/737
See application file for complete search history.

(56) References Cited

U.S. PATENT DOCUMENTS

| | | | |
|---|---|---|---|
| 9,916,232 B2 | 3/2018 | Voccio et al. | |
| 10,129,118 B1 * | 11/2018 | Ghare ................... | H04L 43/028 |
| 10,454,940 B2 | 10/2019 | Lander et al. | |
| 10,878,079 B2 | 12/2020 | Vepa et al. | |
| 11,574,236 B2 * | 2/2023 | Shivamoggi ............. | G06N 5/01 |
| 2014/0208296 A1 | 7/2014 | Dang et al. | |
| 2017/0257886 A1 | 9/2017 | Adjakple et al. | |

(Continued)

FOREIGN PATENT DOCUMENTS

| | | |
|---|---|---|
| CN | 113630419 A | 11/2021 |
| CN | 116781431 A | 9/2023 |

OTHER PUBLICATIONS

PCT/IB2024/053467, International Search Report and Written Opinion mailed on Jun. 27, 2024, 7 pages.

*Primary Examiner* — Joshua Bullock
(74) *Attorney, Agent, or Firm* — David H. Judson

(57) ABSTRACT

A system and method for clustering computing interface calls. A method includes: determining a plurality of computing interface cluster definitions, the plurality of computing interface cluster definitions including a plurality of parameter type strings; and clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

20 Claims, 4 Drawing Sheets

(56)　　　　　　References Cited

U.S. PATENT DOCUMENTS

| | | | | |
|---|---|---|---|---|
| 2017/0289240 | A1* | 10/2017 | Ghare | H04L 67/10 |
| 2018/0225158 | A1* | 8/2018 | Guigui | G06F 9/542 |
| 2020/0090052 | A1 | 3/2020 | Nelson et al. | |
| 2020/0233728 | A1* | 7/2020 | Manzano | G06F 9/5083 |
| 2020/0336502 | A1* | 10/2020 | Xu | G06N 3/02 |
| 2020/0336503 | A1* | 10/2020 | Xu | G06F 11/0772 |
| 2022/0027417 | A1 | 1/2022 | Katz et al. | |
| 2022/0311789 | A1* | 9/2022 | Luk-Zilberman | G06F 16/285 |
| 2022/0318378 | A1* | 10/2022 | Guntar | G06N 3/04 |
| 2022/0382617 | A1* | 12/2022 | Tiwari | H04L 63/1425 |
| 2024/0036957 | A1* | 2/2024 | Long | G06F 9/545 |

* cited by examiner

TECHNIQUES FOR SECURING COMPUTING INTERFACES USING CLUSTERING

CROSS-REFERENCE TO RELATED APPLICATIONS

This application is a continuation of U.S. patent application Ser. No. 18/297,789 filed on Apr. 10, 2023, now pending, the contents of which are hereby incorporated by reference.

TECHNICAL FIELD

The present disclosure relates generally to computing interface cybersecurity, and more specifically to cybersecurity related to call flows for computing interfaces.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components. A flawed API can lead to exposure of sensitive data, account takeovers, and even denial of service (DOS) attacks. As a result, securing APIs is a top priority of many computing services providers.

A call to an API typically includes some form of method verb representing an action to be taken via an API (e.g., GET, POST, PUT, DELETE, etc.), a domain, and a path. Certain portions of API calls may be divided into segments, each of which might include parameters defining paths (or portions thereof), query parameters, or a combination of path parameters and query parameters.

Segments are typically defined with respect to one or more bookend characters such as, but not limited to, a pair of slash marks (with one slash mark at the beginning of the segment and another slash mark at the end), a beginning slash mark with no further segments thereafter (i.e., even without an ending slash mark), or an end slash mark without a slash mark preceding it. Each bookend character marks either the beginning or end of a segment such that the bookend characters can be used collectively to define different segments within an API.

API calls may be made in malicious attempts to improperly access data. Accordingly, techniques which allow for identifying patterns in API behavior with respect to these API calls would be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for clustering computing interface calls. The method comprises: determining a plurality of computing interface cluster definitions, the plurality of computing interface cluster definitions including a plurality of parameter type strings; and clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

Certain embodiments disclosed herein also include a non-transitory computer readable medium having stored thereon causing a processing circuitry to execute a process, the process comprising: determining a plurality of computing interface cluster definitions, the plurality of computing interface cluster definitions including a plurality of parameter type strings; and clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

Certain embodiments disclosed herein also include a system for clustering computing interface calls. The system comprises: a processing circuitry; and a memory, the memory containing instructions that, when executed by the processing circuitry, configure the system to: determine a plurality of computing interface cluster definitions, the plurality of computing interface cluster definitions including a plurality of parameter type strings; and cluster a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
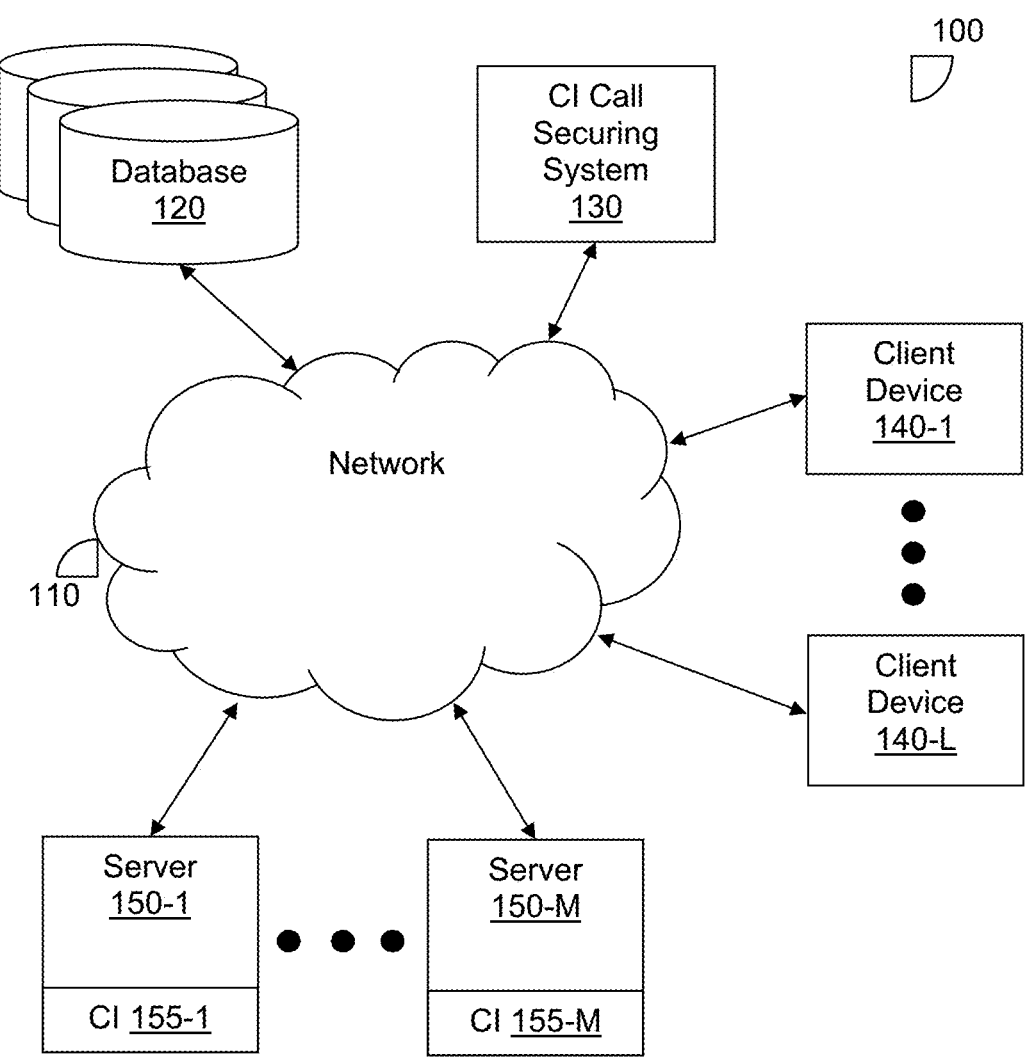
FIG. 1 is a network diagram utilized to describe various disclosed embodiments.

The various disclosed embodiments include techniques for securing call flows for computing interfaces such as application programming interfaces (APIs) using clustering. In an embodiment, clusters are defined using probabilistic modeling based on pattern matching between instances of computing interfaces. After the clusters are defined, incoming calls may be analyzed with respect to the clusters to determine to which cluster each call belongs in order to establish baseline behavior for each cluster. Behavior related to the computing interface calls is monitored with respect to the established baseline in order to detect anomalous behavior. When anomalous behavior is detected, mitigation actions may be performed in order to mitigate potential cybersecurity threats reflected in the anomalous behavior.

In this regard, it is noted that some existing solutions could hypothetically utilize a dictionary in order to distinguish between parameters and non-parameters (e.g., by identifying predefined terms of the dictionary in segments). However, simply using a dictionary would fail to accurately identify parameters in many cases such that clustering cannot be effectively performed in those cases.

As various non-limiting examples for challenges of the dictionary-based approach, consider the following strings which may each be a segment: "orderstatus" (no dictionary entry will match this concatenated string even if there are dictionary entries for "order" and "status"); "dogs" (unless the dictionary explicitly includes entries for the plural version of every noun); "shop8787" (mix of letters plus numbers); and the like. Additionally, when path information within a segment includes country or region information such as a segment "il.test" (i.e., including the country code for Israel) or a segment "us.test" (i.e., including the country code for USA), a dictionary may not recognize that these entries actually form a path to the same endpoint despite the differences in country code. Also, strings which might include multiple parameters such as "user123_order456" (where 123 and 456 are different parameters) may be particularly challenging to identify using simple dictionaries or preset parameter identification rules.

Additionally, it is noted that clustering requires a balance with respect to the number of nodes in order to be effective. If there are too many or too few nodes, the clusters do not accurately represent the different groups, and any subsequent analysis therefore becomes less accurate. Further, in order to illustrate groups in a manner that is readily digestible for users, the number of clusters to be used must be limited. Thus, selecting and using appropriate cluster criteria is a technical challenge which must be overcome when utilizing clustering as part of a process.

This technical challenge in clustering appropriately is particularly relevant in the context of computing interfaces such as APIs due to the nature of computing interface calls. As noted above, portions of computing interface calls may be broken into segments, and each of these segments may include information related to paths (i.e., location-based data), information to be used by the API being called (e.g., parameters such as identifiers of specific users, information about specific data being requested, or authentication information used to authenticate users).

It has been identified that the structure of an API call may vary in parameters being passed between different instances of calling the same API, but that path information tends to remain consistent. As a non-limiting example, two instances of the same API call made in order to retrieve different information may be as follows:

GET test.com/user/1
GET test.com/user/2
GET test.com/user/3

In the above non-limiting example, each API call has a hypertext transfer protocol (HTTP) verb "GET" as well as 3 segments separated by slashes: "test.com", "user" and a number (i.e., "1", "2", or "3"). For situations like this in which multiple API calls are closely related, the first two segments of each call ("test.com" and "user") include path information of an endpoint, while the third segment includes an instance-specific parameter that will be passed to the endpoint such that these 3 instances would normally appear to a system performing clustering to be calls to 3 distinct endpoints rather than 3 instances of calling the same endpoint. Thus, in some example implementations, the disclosed embodiments may yield a cluster defined as follows:

test.com/user/<number>

In the above example cluster, the API is defined with respect to 3 segments, where the last segment is generalized to represent the parameter being passed as the string "<number>". In a further example, any number, or any number having a particular format, may be identified as <number> for purposes of defining the API being called such that the above 3 API calls "GET test.com/user/1", "GET test.com/user/2", and "GET test.com/user/3" would be clustered into the same group. This may be particularly important because each of the users 1, 2, and 3 may only access this particular API once or otherwise may only access this API a limited number of times. In that case, clustering per user would result in a low sample size of, for example, 1-2 calls per cluster, which is not large enough to draw meaningful inferences from.

Across thousands or millions of API calls, this may result in each endpoint (i.e., the subject of the API call) being grouped into its own cluster. The result is that the clusters have an extremely small sample size from which inferences can be drawn (e.g., inferences regarding normality of behavior used for cybersecurity purposes). Moreover, it has been further identified that processing and transmitting data about such a large number of clusters (i.e., a number of clusters that is around the same size as the total number of API calls) requires significantly more computing resources than a solution which more effectively clusters the API calls based on calls to distinct APIs rather than solely based on the calls themselves.

Accordingly, various disclosed embodiments cluster computing interface calls in a manner that generalizes portions of such calls related to instance-specific or user-specific parameters being passed in order to effectively cluster computing interface calls with respect to distinct endpoints rather than with respect to distinct endpoint-parameter combinations. The disclosed embodiments therefore provide clustering techniques which reduce memory consumption, reduce time spent executing (runtime), improve user interface visibility, improve anomaly detection, and the like.

More specifically, the disclosed embodiments may be utilized to reduce the total number of clusters for which analysis needs to be performed. For example, baseline behaviors may be established with respect to such a reduced set of clusters rather than needing to establish baselines with respect to each individual computing interface instance, thereby reducing processing related to establishing such baselines. Moreover, since those individual computing interface instances may not accurately reflect larger behavioral trends across different users, clustering the computing interfaces in this manner allows for providing larger sample sizes for establishing baseline behavior which, in turn, allows for more accurately detecting abnormal behavior to be mitigated.

Moreover, it has been identified that the parameters included in computing interface calls often do not perfectly match common words or phrases in a given language (e.g., English) even when the computing interface calls otherwise use words in that language. In other words, parameters often appear like gibberish when compared to words in a predefined dictionary, particularly when certain operators of computing interfaces use their own lingo. Accordingly, the probabilistic modeling as described herein allows for effectively identifying parameters for clustering purposes more accurately than solutions which only identify predefined dictionary terms as parameters.

Additionally, various disclosed embodiments provide techniques for clustering computing interface calls which do not require first breaking up the computing interface calls into individual components before clustering processing. That is, various disclosed embodiments provide techniques for defining clusters which can be utilized to perform clustering without first breaking each computing interface call into segments. In this regard, it is noted that cybersecurity for computing interface calls often requires real-time discovery and detection of potential cyberthreats as reflected in computing interface calls such that techniques which require first breaking calls into discrete components before clustering would slow response times, thereby reducing the ability to timely secure against potential threats. Moreover, processing clusters in their entirety instead of breaking them into discrete components reduces use of processing power and other computing resources that would otherwise need to be utilized for such a pre-processing stage.

The disclosed embodiments further leverage such improved computing interface call clustering in order to improve cybersecurity related to computing interfaces, namely, by appropriately clustering computing interface calls in order to establish baseline behavior for those clusters that accurately illustrate trends in computing interface call behavior which can be used to detect potentially malicious anomalies in that behavior. In particular, clustering computing interface calls appropriately using the techniques described herein allows for increasing the number of samples for each cluster in a manner that allows for sufficiently large sample size to accurately model behavior, thereby improving cybersecurity techniques performed based on this modeled behavior. Various disclosed embodiments further use anomalies detected in this manner in order to mitigate potential cybersecurity threats.

FIG. 1 shows an example network diagram 100 utilized to describe the various disclosed embodiments. In the example network diagram 100, one or more databases 120, a computing interface (CI) call security system 130, client devices 140-1 through 140-L (where L is an integer having a value equal to or greater than 1), and servers 150-1 through 150-M (where M is an integer having a value equal to or greater than 1) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The databases 120 store data related to existing computing interfaces such as, but not limited to, application programming interfaces (APIs). Such data may include, but is not limited to, computing interface names of specific instances of computing interfaces (e.g., as indicated in historical computing interface calls). The data may be utilized in order to define clusters with respect to computing interface names, which in turn may be utilized to cluster computing interface calls as described herein. The databases may further store computing interface calls made to the computing interfaces 155, which can be analyzed by the CI call security system 130 for behavioral anomalies as discussed herein.

The CI call security system 130 is configured to perform at least a portion of the disclosed embodiments related to clustering computing interface calls. To this end, the CI call security system 130 may be configured to define clusters (e.g., based on data obtained from the databases 120) and to utilize the cluster definitions to cluster computing interface calls (e.g., computing interface calls made by the client devices 140 to computing interfaces 155 of the servers 150, computing interface calls made between computing interfaces 155 among the servers 150, both, and the like).

Each of the client devices 140 may be, but is not limited to, a personal computer, a laptop, a tablet computer, a smartphone, a wearable computing device, or any other device configured to make computing interface calls to services hosted by the servers 150. The servers 150, in turn, host services used by the client devices 140, and utilize computing interfaces 155 in order to facilitate delivering those services. Computing interface calls made to the computing interfaces 155 among the servers 150 may be clustered as described herein and monitored in order to establish baseline behavior for each cluster in order to detect anomalous computing interface call behavior as described herein.

It should be noted that FIG. 1 depicts an "out-of-path" implementation in which the CI call securing system 130 is deployed out of line, i.e., not as a middle system between servers among the servers 150. In certain implementations, the CI call securing system 130 may be deployed inline between any or all of the servers 150, or multiple instances (not shown) of the CI call securing system 130 may be deployed between servers among the servers 150, without limitation on the disclosed embodiments.

Further, the services hosted by the servers 150 may be "internal services" hosted on 150, but the disclosed embodiments are equally applicable to the servers implementations in which those internal services of the servers 150 may communicate with one or more "external services" hosted on servers other than the servers 150 (not shown). As a non-limiting example, the servers 150 may be servers operated by one entity in a first network environment, and the services hosted by the servers 150 may access services hosted by another entity in one or more other network environments.

Figure 2:
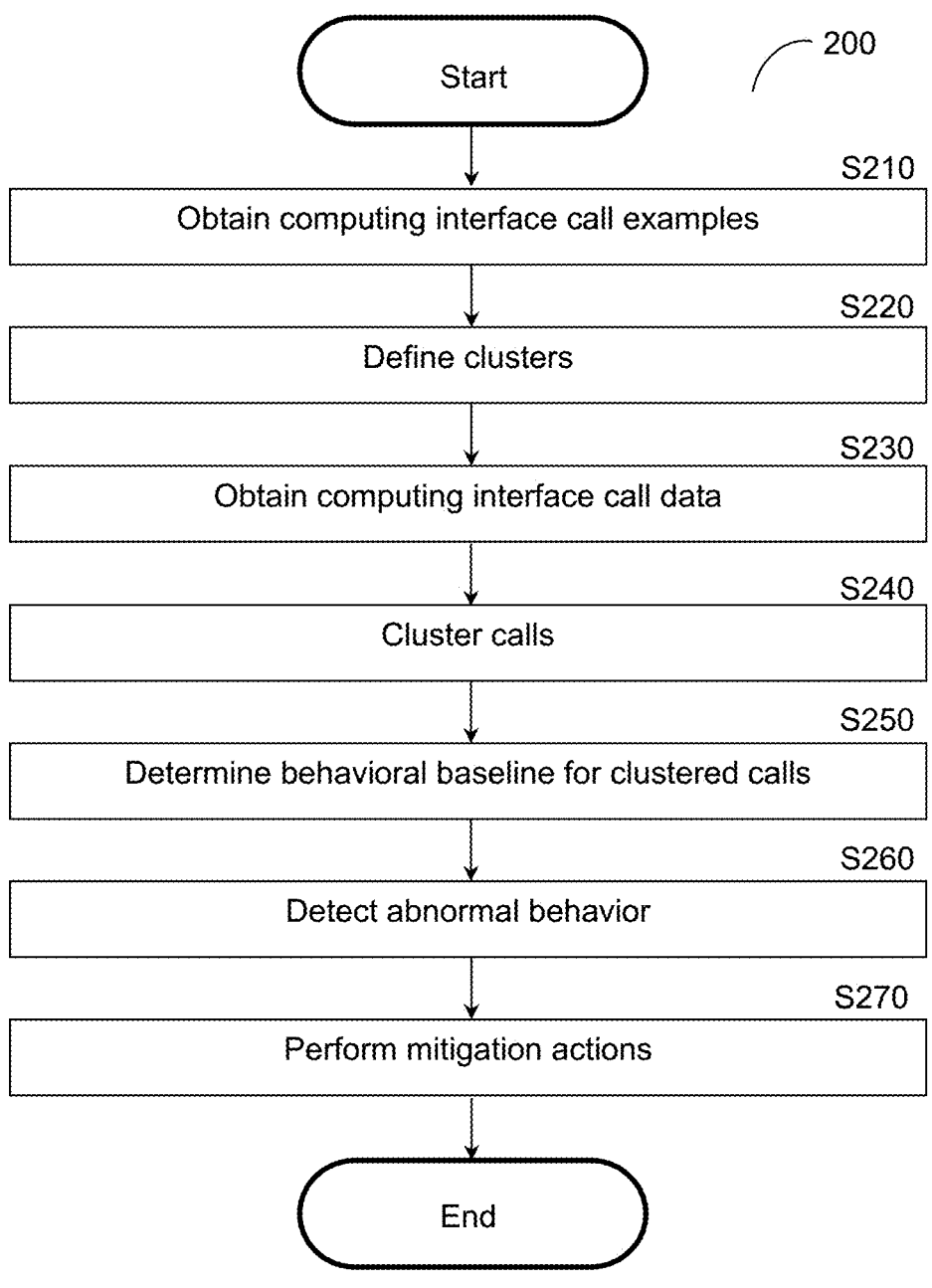
FIG. 2 is a flowchart illustrating a method for securing computing interfaces using behavior defined with respect to computing interface call flows according to an embodiment.

FIG. 2 is a flowchart 200 illustrating a method for securing computing interfaces using behavior defined with respect to computing interface call flows according to an embodiment. In an embodiment, the method is performed by the computing interface call security system 130, FIG. 1.

At S210, computing interface call examples are obtained. The examples may be read or otherwise retrieved, for example, from a database (e.g., one or more of the databases 120, FIG. 1).

At S220, clusters are defined in order to create cluster definitions. In an embodiment, the clusters are defined with respect to distinct computing interface groups determined using probabilistic modeling.

More specifically, the clusters are defined such that specific parameters being passed in computing interface examples are generalized into parameter type strings. Each cluster definition may be, but is not limited to, a computing interface name including one or more portions of strings indicating path information and optionally including one or more of those parameter type strings.

Moreover, each parameter type string may correspond to a type of parameter which may be defined with respect to factors such as, but not limited to, type of data (e.g., string, integer, float; numbers, letters, symbols, or combinations thereof; etc.), formatting of the data, appearances of any special characters, content of the data (e.g., appearances of known country codes, language codes, currency codes, etc.), combinations thereof, and the like. As non-limiting examples for such formatting, some portions of segments may be classified as a specific type of 7-digit user identifier when a portion of a segment includes exactly 7 number characters, while other portions of segments including numbers may be classified as dates when a portion of a segment includes exactly 8 number characters. In an embodiment, the clusters are defined as described further below with respect to FIG. 3.

At S230, computing interface call data is obtained. As a non-limiting example, the computing interface call data may include calls to any or all of the computing interfaces 155, FIG. 1. Each computing interface calls may include, but are not limited to, a verb or method (e.g., a HTTP verb) as well as an instance of a computing interface name. Each instance of a computing interface name, in turn, may indicate a path to an endpoint and one or more parameters, any of which may be divided into segments by bookend characters such as slash marks.

At S240, computing interface calls among the computing interface call data are clustered according to the cluster definitions created at S220. To this end, S230 may include, but is not limited to, matching each computing interface call or portion thereof (e.g., a portion excluding the verb) to the cluster definitions created at S220 in order to determine whether each computing interface call matches one of the clusters. Moreover, the parameter type strings in the cluster definitions may be compared to the computing interface calls using parameter type comparison rules that determine whether a given portion of a computing interface call matches a type of parameter indicated by the parameter type string including, but not limited to, analyzing the data type, format, and the like, of each segment.

To this end, in an embodiment, S240 includes matching computing interface call instances in order to determine computing interface call instances matching respective computing interface cluster definitions, and grouping the computing interface call instances into clusters of computing interface calls having the same computing interface cluster definition. Further, S240 includes identifying portions of the computing interface call instances which match types of parameters represented by respective string type parameters of the computing interface cluster definitions. In this manner, parameters in those identified portions may be generalized for purposes of comparing to the computing interface cluster definitions such that clustering of calls may be achieved despite potential differences in instance-specific parameters. Moreover, the resulting clusters may include fewer clusters than the number of original computing interface call instances, which in turn reduces subsequent processing as described herein.

At S250, baseline behavior is established with respect to the clustered calls. The baseline behavior may include, but is not limited to, the computing interfaces being called, sequences of computing interfaces being called, timing of computing interface calls, sources of computing interface calls (e.g., particular systems or computing environments), combinations thereof, and the like. Moreover, any or all of those baseline behaviors may further be defined with respect to user activity which, in turn, may be defined with respect to specific users, types of users, users from the same source (e.g., based on calls made from the same computing environment or network), combinations thereof, portions thereof, and the like. Even further, the baseline behavior may be established differently for different entities, e.g., for entities owning or operating different computing environments based on analysis of data collected from their respective computing environments.

In some embodiments, computing interface call flows may be analyzed, where the call flows are defined with respect to computing interfaces according to the cluster definitions such that computing interface calls matching the same cluster are determined to represent a call to the same computing interface, and flows between computing interfaces may be defined based on calls to and from the same computing interface.

At S260, abnormal behavior is detected based on the determined baseline behaviors. The abnormal behavior may be, but is not limited to, behavior that deviates from one or more of the determined baseline behaviors above a threshold. In an embodiment, the abnormal behavior is based on subsequently observed computing interface calls (i.e., calls observed after the establishment of the baseline behavior). In this manner, the baseline behavior may effectively be extrapolated to future behavior and utilized to determine whether the future behavior is abnormal.

At S270, one or more mitigation actions are performed with respect to the detected abnormal behavior. The mitigation actions may include, but are not limited to, blocking traffic, reconfiguring computing interfaces, reconfiguring computing interface gateways (e.g., API gateways), generating alerts, generating and sending notifications, combinations thereof, and the like.

Figure 3:
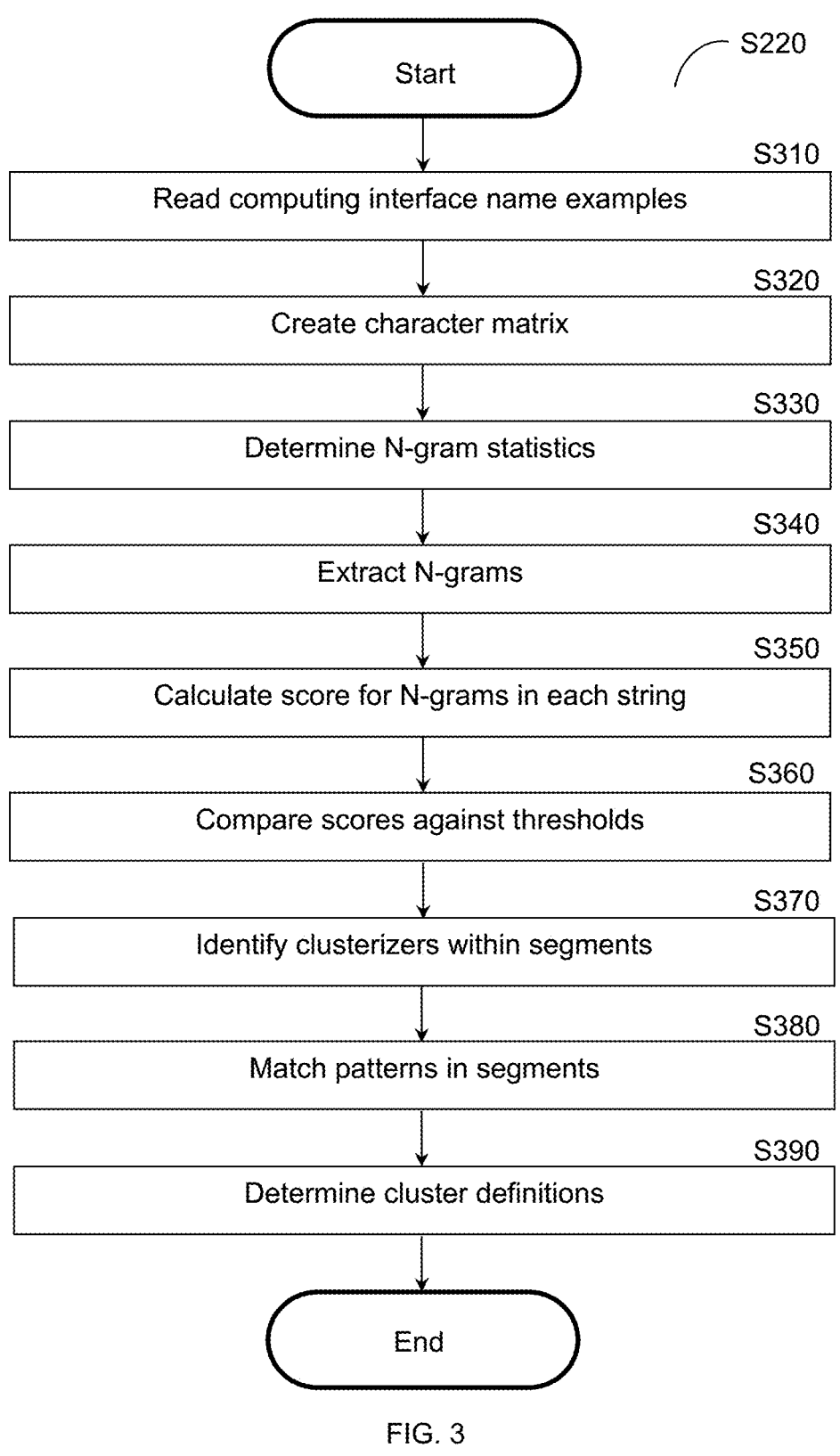
FIG. 3 is a flowchart illustrating a method for defining computing interface clusters according to an embodiment.

FIG. 3 is a flowchart S220 illustrating a method for defining computing interface clusters according to an embodiment.

At S310, computing interface name examples are read, for example, from a database (e.g., one or more of the databases 120, FIG. 1). In some implementations, the set of computing interface name examples are examples for a particular entity (e.g., an entity who owns or operates a computing environment hosting services to which computing interface calls are made). In this regard, cluster definitions may be created which are entity-specific in order to improve cluster determination when analyzing computing interface calls to or from computing interfaces for that entity.

At S320, a character matrix is created based on the computing interface name examples. The character matrix includes entries representing potential combinations of characters. In a non-limiting example implementation, a two-dimensional matrix is created including entries representing every combination of two English letters. Moreover, the character matrix may include each potential ordered combination of characters. As a non-limiting example, the ordered combinations "a-k" and "k-a" may be two entries in a two-dimensional character matrix.

It should be noted that S310 and S320 are depicted as part of a single flow with the rest of FIG. 3 merely for illustrative purposes, and that the disclosed embodiments are not necessarily limited to performing these steps as part of the same flow. As a non-limiting example according to at least some embodiments, character matrices may be created as discussed with respect to S310 and S320 in advance, and subsequently computing interface names may be analyzed with respect to these predefined character matrices. Further, the subsequently analyzed computing interface names may be names among the name examples, or may be a different set of names (e.g., a set of computing interface names belonging to a specific entity or organization). In this regard, the character matrix may be defined more generally (i.e., non-entity or organization specific), and the cluster definitions may be defined per entity or organization (i.e., based on the examples of general kinds of computing interface names observed within data related to that entity or organization).

At S330, N-gram statistics are determined for the computing interface name examples based on the character matrix. Each N-gram is a continuous sequence of N items, where N is an integer greater than or equal to 1. In an embodiment, each of the N-grams is a continuous sequence of 2 characters, where each sequence of 2 characters includes the characters of one of the potential combinations of characters represented in the character matrix.

In an embodiment, S330 includes calculating a number of occurrences (i.e., a count) of each N-gram. In a further embodiment, a value representing the relative frequency of each N-gram among the population of N-grams in the computing interface name examples is determined. In an example implementation, such a value may be calculated as log (count).

At S340, N-grams represented in the character matrix are extracted from the computing interface name examples. Each N-gram is a contiguous sequence of N items (e.g., characters) from a given sample of the computing interface name examples (e.g., of strings among those examples), where N is an integer having a value of 1 or greater. In an embodiment, the N-grams are 2-grams including 2 characters. As a non-limiting example, when a string among the computing interface name examples is "Father", the 2-grams "fa", "at", "th", "he", and "er" may be extracted from that string.

At S350, a score is determined for the N-grams in each string among the computing interface examples. As a non-limiting example for the "Father" example above, the score may be calculated as an average value as follows:

$$\text{score (average)} = [\text{value ('fa')} + \text{value ('at')} + \text{value ('th')} + \text{value('he')} + \\ \text{value ('er')}]/5$$

Where the value of each N-gram may be the value indicating relative frequency as discussed above with respect to S330.

At S360, it is determined whether each score is above a threshold. The threshold may be a predetermined threshold set based on the use case. As a non-limiting example, the threshold may be a predetermined value set for the English language (i.e., a known value used for determining meaningful English language words). In other words, such a comparison may allow for recognizing whether words are gibberish or otherwise lack meaning according to one or more languages. It has been identified that parameters tend to be gibberish (i.e., unrecognizable as a word) such that the threshold may be utilized to identify portions of segments which are likely to represent parameters.

In some implementations, the threshold is determined based on one or more datasets including labeled strings, where the labels indicate whether a given string in the datasets has a positive association as a "real" word or a negative association as a "gibberish" word. The positively labeled strings may be a dictionary of many example strings of known words, and the positively labeled strings may include random strings that collectively have the same or a similar distribution of lengths of those strings as compared to the dictionary of the positively labeled strings. The threshold may be selected so as to minimize mistakes, i.e., when the threshold is applied as discussed above, the threshold results in the lowest number of negatively labeled strings being above the threshold, the highest number of positively labeled strings being below the threshold, or both, as compared to other potential threshold values.

At S370, clusterizers are identified within segments of the computing interface examples. Each clusterizer is at least a portion of a string (e.g., a string or substring) which demonstrates a recurring pattern within the computing interface examples, for example, as determined using regular expressions. Each clusterizer is identified as one of the strings having an average value below the threshold or a portion thereof (e.g., a substring that is part of a string having an average value below the threshold).

In an embodiment, each segment among the computing interface name examples may be divided into clusterizers and leftovers, where the leftovers are portions of segments (e.g., strings) which do not belong to any clusterizer.

In a further embodiment, S370 may also include verifying one or more minimum count conditions for each potential clusterizer identified within segments. Such minimum count conditions may define minimum counts for each clusterizer with respect to counts of the clusterizers within segments, for example a number of instances of each clusterizer demonstrating the same ancestor (e.g., the same clusterizer preceding that clusterizer), a number of instances of each clusterizer appearing within the same segment pattern, both, and the like. Such minimum count conditions may serve as an additional check to ensure that clusterizers yield accurate clusters when utilized as part of cluster definitions.

Each segment pattern represents a pattern of the segment and may be defined with respect to clusterizers (or potential clusterizers) and leftovers within each segment such that each segment pattern represents the contents of the entire segment. Moreover, each segment pattern may be an ordered sequence of clusterizers and leftovers arranged according to the order in which each clusterizer or leftover appears within the segment. These segment patterns may be utilized to identify commonalities between segments, and moreover may be utilized as further evidence that a potential clusterizer is actually a clusterizer. That is, if a potential clusterizer appears in the same segment pattern above a threshold number of times, the potential clusterizer is much more likely to be an actual clusterizer. Each leftover may be generalized into a general format leftover based on the type of data, how the characters of the leftover are arranged, both, and the like.

At S380, clusterized string lists are matched between the segments of the computing interface examples. In an embodiment, S380 includes generating a clusterized string list for each segment, where the clusterized string list is an ordered list of clusterizers in each segment which can be compared in order to match between segments (i.e., two segments may match if the clusterized string lists of the segments match). The clusterized string lists may be utilized to determine cluster definitions, more specifically, by performing a multiple clusterizer test for segments including multiple clusterizers in addition to the per-clusterizer count tests discussed above.

At S390, cluster definitions are determined based on the pattern matching. In an embodiment, the cluster definitions are added to a cluster definitions dictionary which can be referenced in order to determine clusters to which computing interfaces indicated in subsequent computing interface calls belong. The cluster definitions may be provided to an engine for use in identifying clusters by comparing the cluster definitions to subsequent computing interface calls as discussed above.

In an embodiment, S390 further includes performing a multiple clusterizer test to determine whether the set of clusterizers included in each computing interface name example having multiple clusterizers is likely a cluster. To this end, in some embodiments, a cluster is created based on computing interface name examples for which all clusterizers identified therein satisfy the minimum count condition or conditions. When all clusterizers of a computing interface name example fail to satisfy the minimum count condition or conditions, the segments of that computing interface name example may be ignored and a cluster is not created based on those segments.

In a further embodiment, when some of the clusterizers in a computing interface name example meet the minimum count condition or conditions and others fail to satisfy those conditions, an additional check may be performed to determine whether to create a cluster based on that example. In yet a further embodiment, pairs of segment patterns and portions of clusterized string lists are created and utilized to replace clusterizers that failed to meet the applicable conditions. More specifically, each clusterizer that failed to meet those conditions may be replaced with a corresponding portion of the paired clusterized string list. The result is a replaced segment pattern, which may be added as a cluster definition to the cluster dictionary.

Figure 4:
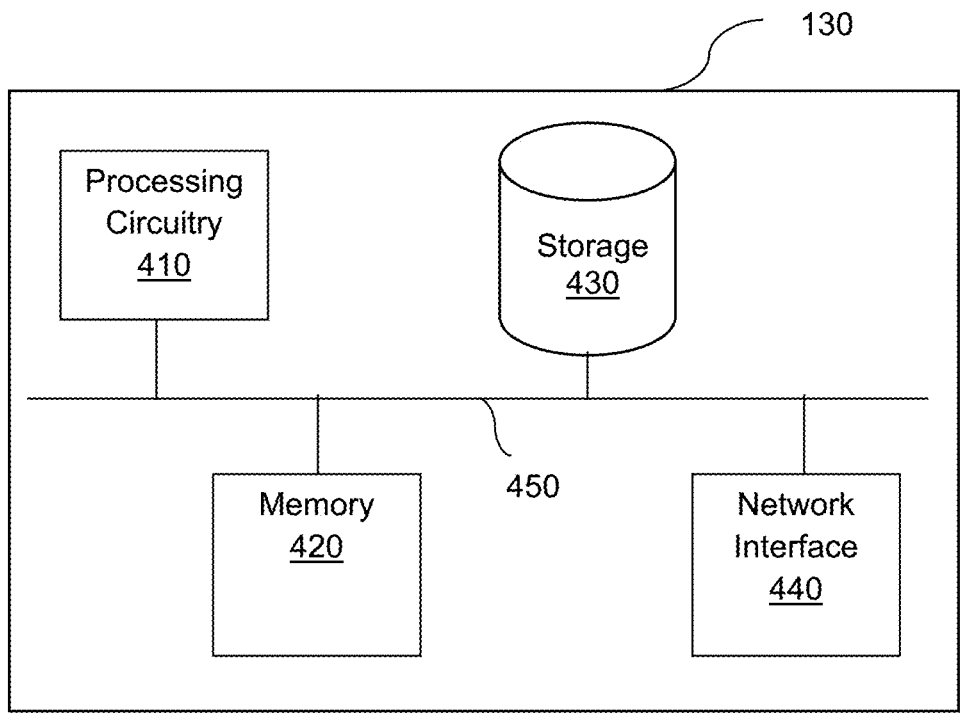
FIG. 4 is a schematic diagram of a computing interface call security system according to an embodiment.

FIG. 4 is an example schematic diagram of a computing interface call security system 130 according to an embodiment. The computing interface call security system 130 includes a processing circuitry 410 coupled to a memory 420, a storage 430, and a network interface 440. In an embodiment, the components of the computing interface call security system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the computing interface call security system 130 to communicate with, for example, the databases 120.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for clustering computing interface calls, comprising:

determining a plurality of computing interface cluster definitions by identifying one or more clusterizers in a plurality of segments of a plurality of computing interface examples, wherein a clusterizer is at least a portion of a string that demonstrates a recurring pattern within the plurality of computing interface examples, the plurality of computing interface cluster definitions including a plurality of parameter type strings; and clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

2. The method of claim 1, further comprising:

establishing baseline behavior for each of the plurality of clusters based on computing interface call data.

3. The method of claim 2, further comprising:

detecting abnormal behavior based on at least one deviation from the established baseline behavior; and securing at least one computing environment by performing at least one mitigation action with respect to the detected abnormal behavior.

4. The method of claim 1, wherein determining the plurality of computing interface cluster definitions further comprises:

matching clusterized string lists between segments of the plurality of segments, wherein each clusterized string list is an ordered list of clusterizers in one of the plurality of segments, wherein the plurality of cluster definitions are determined based on the matching.

5. The method of claim 4, further comprising:

determining whether a set of clusterizers in each computing interface example is a cluster based on whether each of the clusterizers in the set of clusterizer in each computing interface example meets at least one minimum count condition.

6. The method of claim 5, further comprising:

replacing at least one clusterizer among the set of clusterizers with a corresponding portion of a clusterized string list in order to create a replaced segment pattern, wherein each replaced segment pattern is determined as one of the plurality of computing interface cluster definitions.

7. The method of claim 4, further comprising:

creating a character matrix based on the plurality of computing interface name examples, wherein the character matrix includes a plurality of entries representing potential combinations of characters;

determining N-gram statistics for each of the plurality of computing interface name examples based on the character matrix, wherein the plurality of clusterizers is identified based on the determined N-gram statistics.

8. The method of claim 7, further comprising:

determining a score of N-grams for each string among the plurality of computing interface examples; and determining whether the score for each string is above a threshold, wherein each string for which the score is below the threshold is identified as a clusterizer.

9. The method of claim 8, further comprising:

extracting at least one N-gram from each of the computing interface name examples, wherein each N-gram is a contiguous sequence of N characters, wherein the score for each string is determined based on the at least one N-grams extracted from the computing interface name example including the string.

10. A non-transitory computer readable medium having stored thereon instructions for causing a processing circuitry to execute a process, the process comprising:

determining a plurality of computing interface cluster definitions by identifying one or more clusterizers in a plurality of segments of a plurality of computing interface examples, wherein a clusterizer is at least a portion of a string that demonstrates a recurring pattern within the plurality of computing interface examples, the plurality of computing interface cluster definitions including a plurality of parameter type strings; and clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

11. A system for efficiently clustering computing interface calls, comprising:

a processing circuitry; and a memory, the memory containing instructions that, when executed by the processing circuitry, configure the system to:

determine a plurality of computing interface cluster definitions by identifying one or more clusterizers in a plurality of segments of a plurality of computing interface examples, wherein a clusterizer is at least a portion of a string that demonstrates a recurring pattern within the plurality of computing interface examples, the plurality of computing interface cluster definitions including a plurality of parameter type strings; and cluster a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances which match types of parameters represented by respective parameter type strings of the plurality of parameter type strings.

12. The system of claim 11, wherein the system is further configured to:

establish baseline behavior for each of the plurality of clusters based on computing interface call data.

13. The system of claim 12, wherein the system is further configured to:

detect abnormal behavior based on at least one deviation from the established baseline behavior; and secure at least one computing environment by performing at least one mitigation action with respect to the detected abnormal behavior.

14. The system of claim 11, wherein the system is further configured to:

match clusterized string lists between segments of the plurality of segments, wherein each clusterized string list is an ordered list of clusterizers in one of the plurality of segments, wherein the plurality of cluster definitions are determined based on the matching.

15. The system of claim 14, wherein the system is further configured to:

determine whether a set of clusterizers in each computing interface example is a cluster based on whether each of the clusterizers in the set of clusterizer in each computing interface example meets at least one minimum count condition.

16. The system of claim 15, wherein the system is further configured to:

replacing at least one clusterizer among the set of clusterizers with a corresponding portion of a clusterized string list in order to create a replaced segment pattern, wherein each replaced segment pattern is determined as one of the plurality of computing interface cluster definitions.

17. The system of claim 14, wherein the system is further configured to:

create a character matrix based on the plurality of computing interface name examples, wherein the character matrix includes a plurality of entries representing potential combinations of characters;

determine N-gram statistics for each of the plurality of computing interface name examples based on the character matrix, wherein the plurality of clusterizers is identified based on the determined N-gram statistics.

18. The system of claim 17, wherein the system is further configured to:

determine a score of N-grams for each string among the plurality of computing interface examples; and determine whether the score for each string is above a threshold, wherein each string for which the score is below the threshold is identified as a clusterizer.

19. The system of claim 18, wherein the system is further configured to:

extract at least one N-gram from each of the computing interface name examples, wherein each N-gram is a contiguous sequence of N characters, wherein the score for each string is determined based on the at least one N-grams extracted from the computing interface name example including the string.

20. A method for clustering computing interface calls in a computing system having a computing interface call security system that secures computing interfaces, comprising:

determining a plurality of computing interface cluster definitions, at least one computing interface cluster definition including a plurality of parameter type strings;

clustering a plurality of computing interface call instances into a plurality of clusters based on the plurality of computing interface cluster definitions, wherein a number of clusters among the plurality of clusters is fewer than a number of computing interface call instances among the plurality of computing interface call instances, wherein clustering the plurality of computing interface call instances includes determining a plurality of portions of the plurality of computing interface call instances that match types of parameters represented by respective parameter type strings of the plurality of parameter type strings;

establishing baseline behavior for each of the plurality of clusters based on computing interface call data;

detecting abnormal behavior based on at least one deviation from the established baseline behavior; and responsive to detecting abnormal behavior based on at least one deviation from the established baseline behavior, the computing interface call security system performing at least one mitigation action in the computing system with respect to the detected abnormal behavior.

* * * * *